March 9, 1937.　　F. L. IRELAND ET AL　　2,073,064
BEATER
Filed Oct. 12, 1934　　3 Sheets-Sheet 1
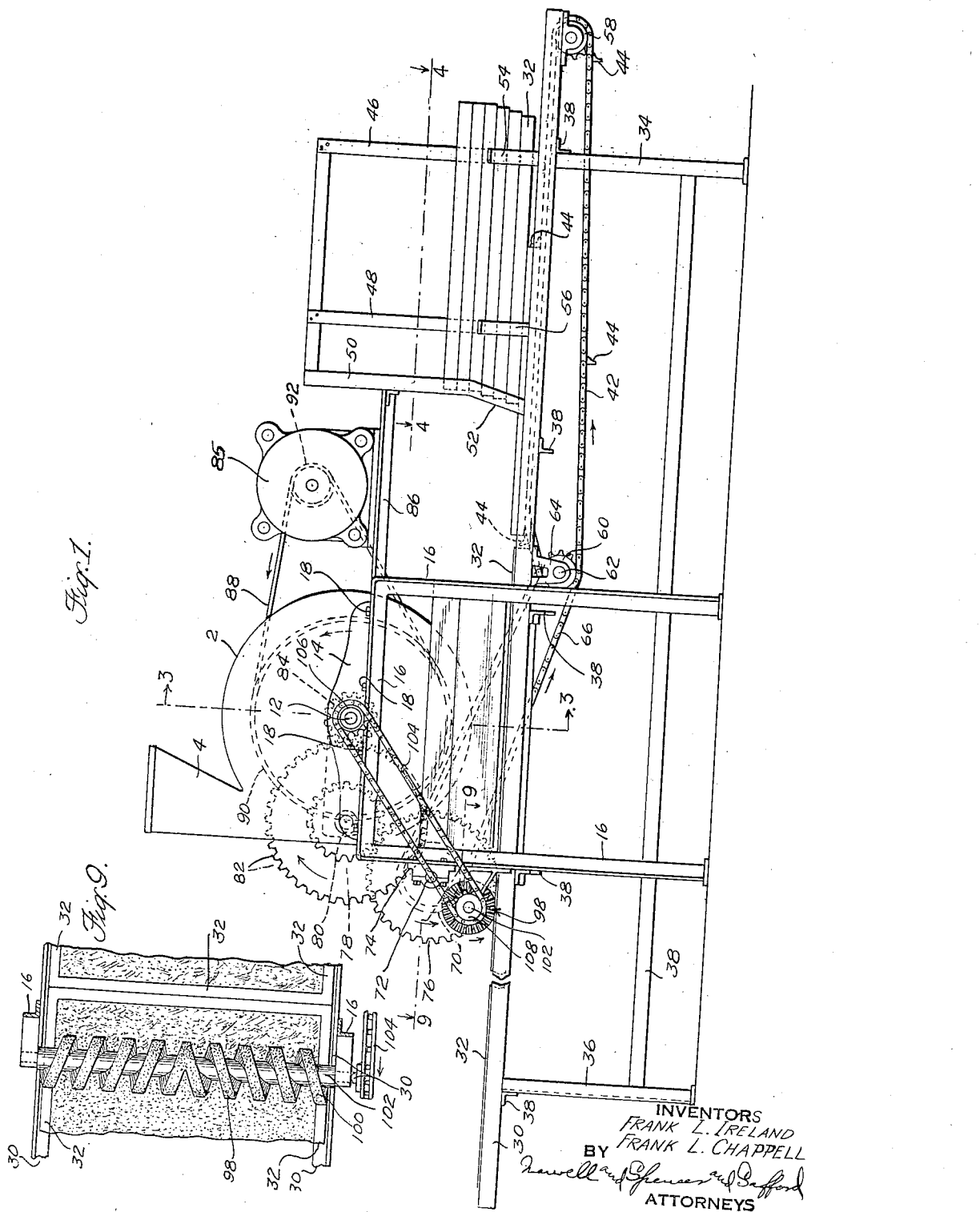

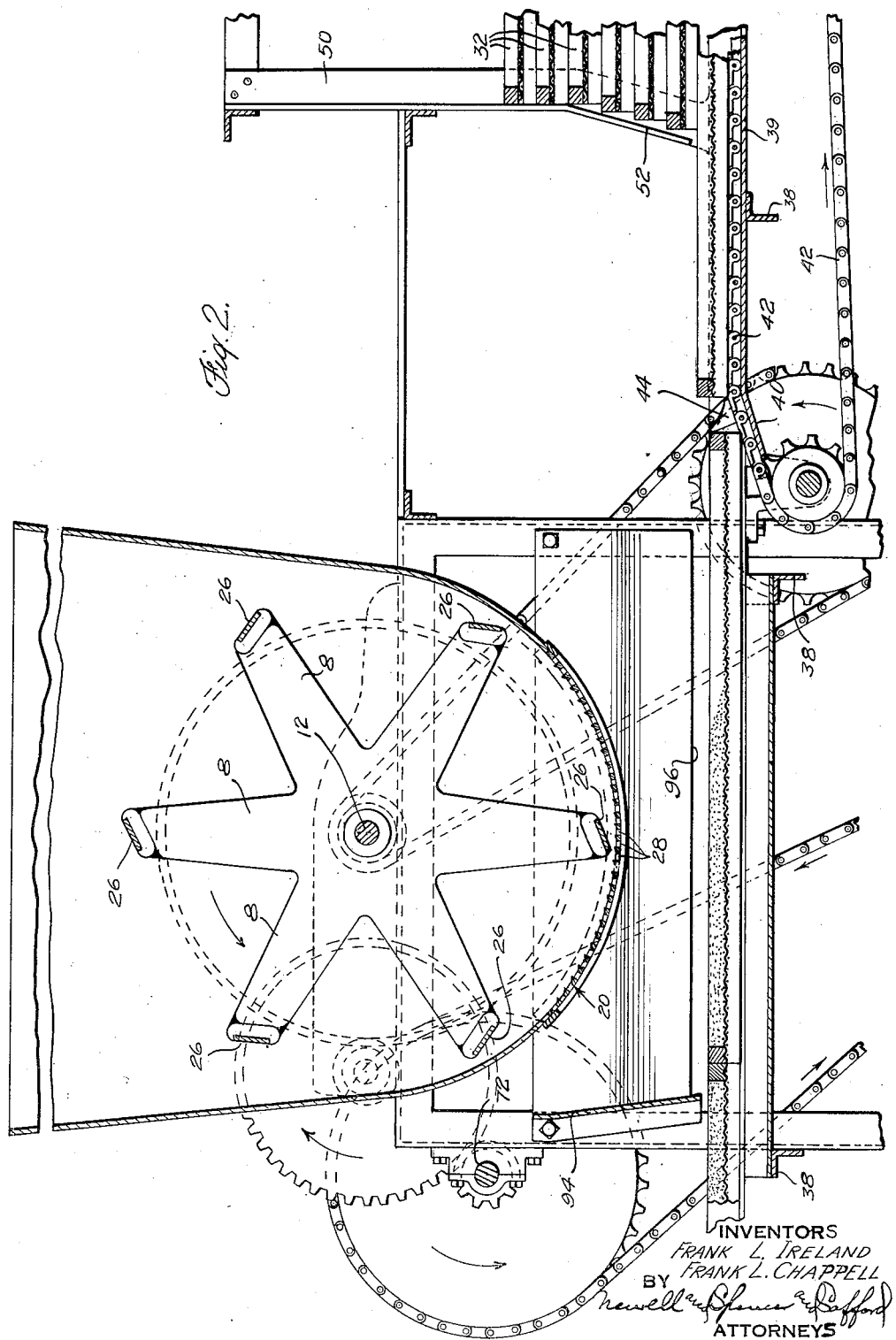

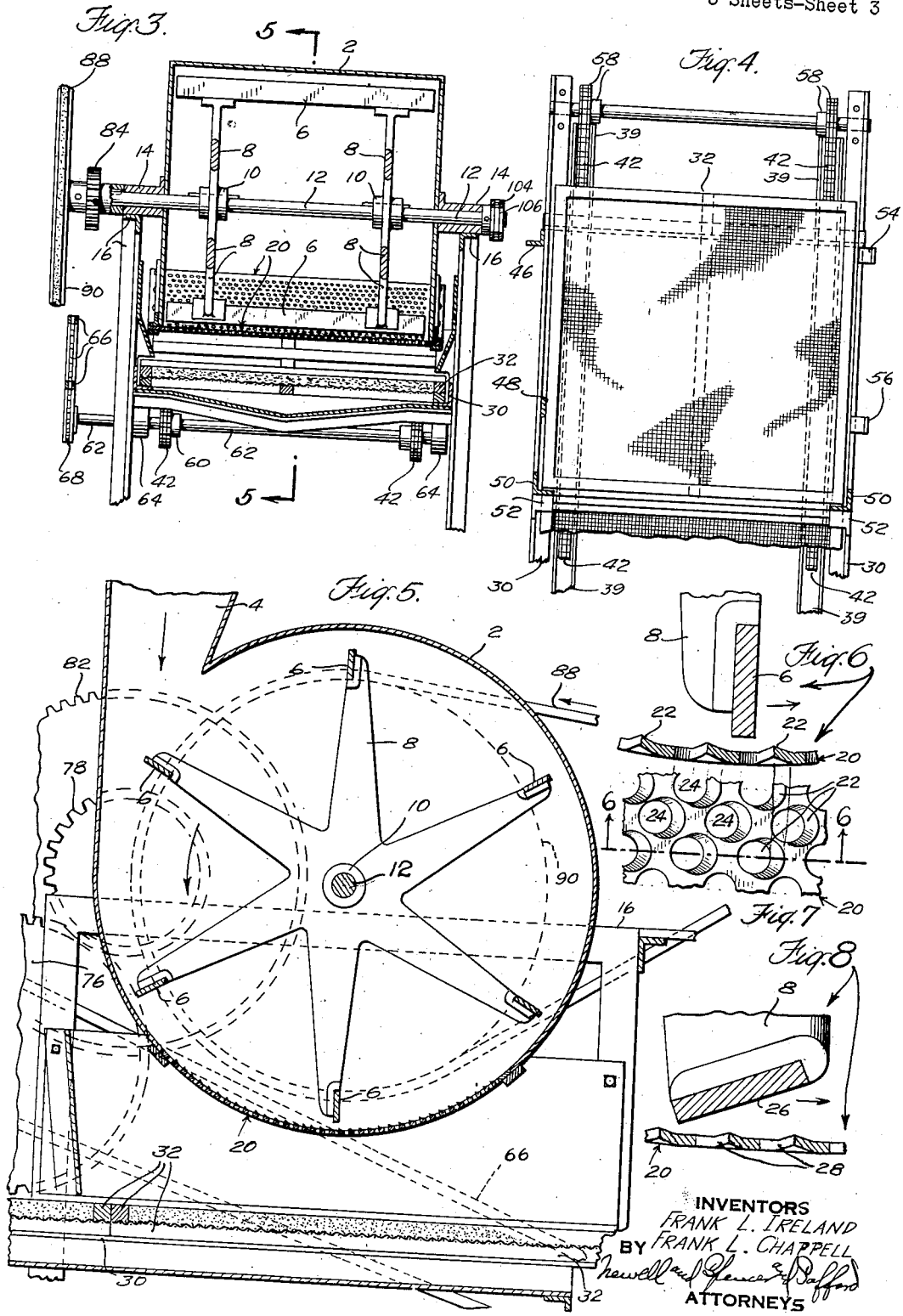

Patented Mar. 9, 1937

2,073,064

UNITED STATES PATENT OFFICE 2,073,064

BEATER

Frank L. Ireland, Norwich, and Frank L. Chappell, Hobart, N. Y.

Application October 12, 1934, Serial No. 748,072

3 Claims. (Cl. 31—48)

This invention relates to beaters or shredders intended primarily to deal with milk products such as casein and condensed whey, and it has for its general object such improvement in apparatus of this class that the material to be treated can quickly and efficiently be prepared for a subsequent desiccating treatment.

In the manufacture of casein it is particularly important, in order to obtain as white a product as possible, that the various operations up to and including the final kiln-drying step be carried out as rapidly and efficiently as possible. In a co-pending application Serial No. 732,670 we have described apparatus for expressing mechanically a large proportion of the water or other liquid content in the casein after it has been separated from the whey and have called attention to the fact that the particular type of press described in said application leaves the curds to some extent in a separated condition and not in cheese-like cakes, as frequently happens with the apparatus of the prior art.

However, to insure rapid and uniform drying it is necessary still further to break up the curds and also to spread them in comparatively thin layers upon open trays so that the hot air of the kiln can circulate freely about the casein particles to be dried.

A particular object of this invention, therefore, is not only quickly and effectively to break up casein curds into comparatively small particles but, as a continuing part of the operation, to distribute them substantially uniformly on trays automatically presented to the beater or shredder, thus preparing the casein for immediate transfer into the kiln.

When the casein has been separated from its whey the whey, of course, contains the other ingredients of the milk or skimmed milk, particularly the lactose. To recover these the whey may be condensed to a thick consistency and then passed through one of the machines of the present invention to prepare it for kiln drying. Although slight differences are required in the arrangement of the beater blades with respect to cooperating parts of the beater casing, the same fundamental apparatus is useful for the two purposes above set forth as well as for other purposes, and one of the objects of the invention is to provide apparatus that can readily be adapted to treat any one of a plurality of milk products.

Important features of the invention are the novel arrangement for preventing sticking of the trays in the stack guides and the novel means for leveling off the material on each tray to facilitate uniform drying.

Other objects and important features of the invention will appear from the following description and claims when considered in connection with the accompanying drawings in which—

Figure 1 is a side elevation of a machine particularly designed for treating casein curds to break them up into comparatively small particles;

Figure 2 is a longitudinal section through a modified embodiment of the invention intended particularly for treating condensed whey;

Figure 3 is a transverse section on the line 3—3 of Figure 1;

Figure 4 is a plan cross-section on line 4—4 of Figure 1 showing detail of the tray feeding mechanism;

Figure 5 is a vertical section on the line 5—5 of Figure 3;

Figure 6 is a section on the line 6—6 of Fig. 7 of one of the beater blades used in the form of the invention shown in Figure 1 and a portion of the cooperating perforated plate;

Figure 7 is a plan detail of the perforated plate shown in Figure 6;

Figure 8 is an enlarged sectional detail of the type of beater blade used in the form of the invention illustrated in Figure 2, and Figure 9 is a plan view of the tray contents leveling rotary brush employed particularly with the form of the invention illustrated in Figure 1.

Describing first the form of the invention illustrated in Figures 1, 3, 5, and 6, the casing 2 of the beater proper is of substantially cylindrical shape with a hopper 4 for the casein curd or other material to be broken up located at one side and so shaped as to feed the material into the casing tangentially to the path of movement of the beater blades. As shown more in detail in the sectional view in Figure 5, the beater blades 6 are mounted on spokes 8 of two spiders having hubs 10 fastened to the beater shaft 12 which is mounted in bearings in castings 14 that serve to support both the beater shaft 12 and also the beater casing 2 upon rectangular frames 16 located upon the two sides of the beater casing, the castings 14 being preferably either riveted or welded to the casing 2 and secured by bolts 18 to the rectangular frames 16.

From an examination of Figure 5 it will be noted that the casing 2 is so supported with relation to the shaft 12 that the path of travel of the beater blades 6 in the casing is somewhat eccentric to the cylindrical section of the casing. At the point where the blades 6 move into closest proximity to the wall of the casing 2 the casing is provided with a perforated and somewhat toothed segment 20, the teeth 22 of which cooperate with the blades 6 to break the curds up into small particles before they drop through the holes 24 of this segment. The teeth 22 are integral with the segment 20 and are each formed by displacing a portion of the material of the segment 22 about one edge of each of the holes 24. Preferably this displacement is effected on that edge of each hole which is the more remote with respect to the direction of movement of the beater blades, as shown in Figs. 6 and 7, the upwardly or inwardly displaced portion of this segment about each hole being substantially crescent-shaped and being preferably so located that the horns of the crescent approximately contact the two ends of the diameter of the hole, thus providing a tooth or projecting edge of the opening extending substantially halfway around the circumference of the opening and having its greatest projection above the surface of the section midway of its extent about the opening.

The gage of the material of the segment 20 may be slightly greater than that of the material used in forming the remainder of the beater casing 2 in order to provide the strength required for the heavier duty that it is obliged to perform and to compensate for the weakening resuling from the perforation. We have found that when the segment 20 is formed of 18-gage material provided with ¼″ openings on 1″ centers it makes a satisfactory toothed screen for cooperation with radially arranged beater blades 6, such as shown in Fig. 5, for treating casein curds.

When treating condensed whey a beater blade 26, such as shown in Figs. 2 and 8, is preferably used, that is, one that effects more of a wiping action. The blade 26 shown in Figs. 5 and 8, used in treating condensed whey, has its side face inclined to a perpendicular to the radius of its path of travel at an angle of about 20°. Furthermore, when treating condensed whey, preferably a somewhat larger opening in the segment 20 is desirable. We have found that openings 28 of a diameter of ½″ and spaced on 1″ centers make suitable openings for use with condensed whey.

For both purposes we have found a maximum tooth projection of 5/64″ to 3/32″ gives satisfactory results. By maximum tooth projection we mean the projection of the middle of the inner curve of the crescent above the surface of the segment 20.

As shown in Fig. 2, there is no distinct hopper for the condensed whey, the whole casing 29 of the whey beater being provided with a flared open top, it not being important that the whey be fed into the apparatus at a tangent to the path of movement of the blades 26. It will be understood that the condensed whey is of comparatively heavy consistency and is not in the form of individual curds as is the casein at the time it is being treated by this machine.

Both the machine for treating the casein curds and the modified form of the machine for treating the condensed whey are preferably provided with means for automatically presenting trays, to receive the material as it comes through the perforations in the bottom of the casing, in succession beneath the bottom of the casing, that is beneath the perforations 24 or 28. As shown in Figs. 1 to 5 inclusive, guides 30, formed of angle iron, for guiding the trays 32 are attached to the rectangular side frames 16 and extend substantial distances in both directions from said side frames, being supported at the front of the machine by legs 34 and at the rear of the machine by legs 36, the entire structure being further braced by longitudinal and transverse angle irons 38 connected to the legs 34 and 36 and to the rectangular frames 16, below the guides 30.

As shown in Figures 1 and 2, a horizontal pair of longitudinal V channel members 39—39 supported on transverse angle irons 38—38 and provided at their rear ends with inclined portions 40 serve as guides for a sprocket chain 42. The sprocket chain 42 is provided with spaced pushers 44, which serve to effect the successive feeding of the trays 32 from a stack maintained in a stack frame at the front of the machine.

This stack frame, as shown, comprises vertical posts 46 and 48 so located with respect to one of the guides 30 as to aline the side edges of the stack of trays with the guide and two other posts 50 which engage the leading edges of the trays, each of the posts 50 having its upper part vertical and its lower part 52 inclined so that the leading edge of the tray next above the lowermost tray will drop freely onto the conveyor as the lowermost tray moves out from beneath it, thus preventing danger of jamming of a tray against the forward stack guides, with liability to breakage of the machine. At the other side of the machine from the vertical posts 46 and 48 short vertical posts 54 and 56 are provided with outwardly flared upper ends to facilitate placing the trays in the stack-holding guides and directing them into proper position to be fed.

Referring to Figures 1, 3, and 5, each of the sprocket chains 42 travels over an idler sprocket wheel 58 at the front end of the machine and over a sprocket wheel 60 on a driven shaft 62 carried in bearings in brackets 64 depending from the guides 30. The shaft 62 is driven by a sprocket chain 66 traveling over a sprocket wheel 68 fixed upon the end of the shaft 62 and over a sprocket wheel 70 on a shaft 72 turning in bearings 74 on the rectangular frames 16, the shaft 72 also carrying a gear 76 meshing with a pinion 78 on a stud shaft 80 which also carries a relatively large gear 82 meshing with a pinion 84 on the shaft 12 that carries the beater blades 6. The shaft 12, in the form of the invention shown in Fig. 1, is driven from an electric motor 85 mounted upon an elevated shelf 86 on the machine frame by means of a belt 88 traveling over a relatively large grooved pulley 90 on the shaft 12 and over a relatively small grooved pulley 92 on the motor shaft.

It has been found in practice that in a beater for treating casein curds in which the outer edges of the beater blade 6 travel in a circular path that is 23 9/16″ in diameter and in which the beater blades are 26½″ long, connections which drive the beater or paddle wheel structure at a speed of 185 R. P. M. produce a blade speed that is satisfactory for the purposes for which the machine is designed.

In the modification of the invention for treating condensed whey, shown in Fig. 2, the speed of rotation of the beater wheel is preferably much less by reason of the nature of the material being treated. In the latter case it has been found that a suitable speed is 10 R. P. M. for the beater wheel structure. To obtain this, with a suitable corresponding speed of movement of the tray-feeding mechanism, a somewhat different driving connection to the motor must be effected together with a different arrangement of gearing.

In order to prevent uneven drying of the material deposited upon the trays 32, the machine is preferably equipped with means for trimming the material in the filled trays to uniform material depths. In the case of the machine for treating condensed whey the trimming may be effected satisfactorily by a stationary trimmer such, for example, as the lower edge of the front guard 94 shown in Figure 2, each of the machines being preferably provided with side guards 96 and a front guard 94.

In the case of the machine shown in Figure 1 for breaking up casein curds a more uniform distribution of the material is sometimes desirable and to this end means is preferably provided which effects both a rearward movement of the material corresponding to a mere scraping action and some lateral movement of the material to insure substantially complete uniformity of depth.

As shown in Figures 1 and 9, suitable means for effecting this more complete uniformity of distribution of the material over the surface of the tray has been found in the employment of a rotating brush 98 which as shown in Figure 9 has its bristles 100 arranged in two oppositely directed spiral lines about the holder 102 meeting at the middle of the brush. This brush has its lower edge traveling in a direction opposite to the direction of movement of the trays 32, as shown by the arrow in Figure 1 and is driven by a sprocket chain 104 from a sprocket wheel 106 on the shaft 12, the shaft or holder 102 of the brush being provided at its end with a sprocket wheel 108.

What is claimed as new is:

1. In a beater, a casing having a perforated bottom forming a segment of a cylinder, a paddle wheel mounted to turn in said casing on the axis of said cylinder, blades carried by said wheel and having their outer edges at a distance from the axis approximating that of said perforated bottom, means for driving said paddle wheel, means operated in timed relation to the operation of said paddle wheel for successively presenting trays beneath said casing bottom to receive the material operated upon by said beater, and means for trimming the contents of said trays to substantially a uniform depth as said trays pass from beneath said perforated bottom, said means comprising a rotary brush operating to effect a movement of the excess material both rearwardly and laterally.

2. In a beater, a casing having a perforated bottom forming substantially a segment of a cylinder, a paddle wheel mounted to turn in said casing substantially on the axis of said cylinder and blades carried by said wheel at a distance from the axis approximating that of said perforated bottom, each of the perforations of said bottom presenting an inwardly projecting lip on the far edge of the perforation with respect to the direction of movement of a blade passing thereover, said lip being defined by intersecting circles eccentric to each other.

3. In a beater, a casing having a perforated bottom forming substantially a segment of a cylinder, a paddle wheel mounted to turn in said casing substantially on the axis of said cylinder, blades carried by said wheel at a distance from the axis approximating that of said perforated bottom and each so inclined to the radius of rotation as to effect a wiping action, each of the perforations of said bottom presenting an inwardly projecting lip on the far edge of the perforation with respect to the direction of movement of a blade passing thereover, said lip being defined by intersecting circles eccentric to each other, means for driving said paddle wheel, and means operating in timed relation to the operation of said paddle wheel for successively presenting trays beneath said casing bottom to receive the material operated upon by said beater.

FRANK L. IRELAND.
FRANK L. CHAPPELL.